(12) United States Patent
Shimizu

(10) Patent No.: US 8,507,394 B2
(45) Date of Patent: Aug. 13, 2013

(54) GLASS COMPOSITION

(75) Inventor: Koji Shimizu, Sagamihara (JP)

(73) Assignee: Ohara Inc., Sagamihara-Shi (JP)

( * ) Notice: Subject to any disclaimer, the term of this patent is extended or adjusted under 35 U.S.C. 154(b) by 1092 days.

(21) Appl. No.: 11/912,221

(22) PCT Filed: Apr. 14, 2006

(86) PCT No.: PCT/JP2006/308373
§ 371 (c)(1),
(2), (4) Date: Oct. 22, 2007

(87) PCT Pub. No.: WO2006/115183
PCT Pub. Date: Nov. 2, 2006

(65) Prior Publication Data
US 2009/0069162 A1 Mar. 12, 2009

(30) Foreign Application Priority Data

Apr. 22, 2005 (JP) ................ 2005-125169

(51) Int. Cl.
*C03C 3/068* (2006.01)
*C03C 3/155* (2006.01)

(52) U.S. Cl.
USPC ............... 501/78; 501/50; 501/51; 501/79

(58) Field of Classification Search
USPC .................. 501/77–79, 50, 51
See application file for complete search history.

(56) References Cited

U.S. PATENT DOCUMENTS

| | | | | |
|---|---|---|---|---|
| 4,612,295 | A * | 9/1986 | Sagara | 501/51 |
| 4,732,876 | A * | 3/1988 | Nagamine et al. | 501/78 |
| 5,330,940 | A | 7/1994 | Aitken et al. | |
| 5,392,376 | A | 2/1995 | Aitken et al. | |
| 6,251,813 | B1 | 6/2001 | Sato | |
| 6,713,419 | B1 * | 3/2004 | Onozawa et al. | 501/78 |
| 6,816,235 | B2 * | 11/2004 | Kido et al. | 355/67 |
| 7,368,404 | B2 * | 5/2008 | Uehara | 501/78 |
| 7,490,485 | B2 * | 2/2009 | Endo | 65/63 |
| 7,846,860 | B2 * | 12/2010 | Tsai et al. | 501/78 |
| 8,110,515 | B2 * | 2/2012 | Shimizu | 501/78 |
| 2004/0127343 | A1 * | 7/2004 | Kasuga et al. | 501/78 |
| 2004/0259714 | A1 | 12/2004 | Fujiwara et al. | |
| 2005/0107240 | A1 * | 5/2005 | Uehara | 501/78 |
| 2005/0164864 | A1 * | 7/2005 | Kasuga et al. | 501/78 |
| 2005/0209085 | A1 * | 9/2005 | Endo | 501/50 |
| 2006/0079390 | A1 | 4/2006 | Kasuga et al. | |
| 2008/0176734 | A1 * | 7/2008 | Oogaki | 501/78 |
| 2008/0188368 | A1 * | 8/2008 | Tsai et al. | 501/78 |
| 2008/0194395 | A1 * | 8/2008 | Endo | 501/78 |
| 2008/0318758 | A1 * | 12/2008 | Imakita et al. | 501/51 |
| 2009/0062101 | A1 * | 3/2009 | Uehara | 501/53 |

FOREIGN PATENT DOCUMENTS

| | | |
|---|---|---|
| CN | 1323281 A | 11/2001 |
| CN | 1510002 A | 7/2004 |
| DE | 19919304 A1 | 11/1999 |
| DE | 10053388 A1 | 5/2001 |
| EP | 1125898 A1 | 8/2001 |
| JP | 6-56472 A | 3/1994 |
| JP | 7-300338 A | 11/1995 |
| JP | 2000-119036 A | 4/2000 |
| JP | 2001-015164 A | 1/2001 |
| JP | 2001-130924 A | 5/2001 |
| JP | 3377454 B2 | 12/2002 |
| JP | 2003-176151 A | 6/2003 |
| JP | 2004002178 A * | 1/2004 |
| JP | 2004-315324 A | 11/2004 |
| JP | 2006021969 A * | 1/2006 |
| JP | 2006-96610 A | 4/2006 |
| WO | WO 2005102949 A2 * | 11/2005 |

OTHER PUBLICATIONS

Korean Office Action dated Nov. 27, 2008, issued in corresponding Korean Patent Application No. 10-2007-7023202.
International Search Report of PCT/JP2006/308373, date of mailing Jul. 14, 2006.
Chinese Office Action dated Dec. 29, 2010, issued in corresponding Chinese Patent Application No. 094142300.
Decision of Patent Rejection issued Apr. 24, 2012 in corresponding Japanese Patent Application 2006-112975.
Office action issued Mar. 29, 2010 in corresponding Chinese Patent Application 2006800133647.
Office action issued Aug. 1, 2011 in corresponding Chinese Patent Application 2006800133647.
J. Qiu, et al., "Lower Non-Radiative Transition Probability in Er3+-Doped Bromide-Modified Sulfide Glasses", Journal of Non-Crystalline Solids, 2001, pp. 88-92, vol. 292, Issues 1-3.
Office action issued Jan. 17, 2012 in corresponding Japanese Patent Application 2006-112975.

* cited by examiner

*Primary Examiner* — Karl E Group
*Assistant Examiner* — Elizabeth A Bolden
(74) *Attorney, Agent, or Firm* — Novak Druce Connolly Bove + Quigg LLP

(57) ABSTRACT

There is provided a glass composition having a devitrification temperature of 1000° C. or below, a glass transformation temperature (Tg) of 535° C. or below and a specific gravity within a range from 3 to 4.

The glass composition has a refractive index (nd) within a range from 1.60 to 1.75 and an Abbe number (vd) within a range from 50 to 60.

13 Claims, No Drawings

GLASS COMPOSITION

TECHNICAL FIELD

This invention relates to a glass composition which, notwithstanding that it comprises $SiO_2$, $B_2O_3$, $La_2O_3$ and $Li_2O$, has a low glass transformation temperature (Tg) and a low devitrification temperature and is suitable for press molding.

BACKGROUND ART

It is a recent general tendency to produce light and small optical elements for portable devices such as digital cameras and mobile telephones by utilizing aspherical lenses produced by press molding. If it is attempted to produce such aspherical lenses by conventional grinding and polishing, it requires many expensive and complex processings A method therefore has recently been used according to which a preform which is obtained by dripping from molten glass or grinding and polishing sheet glass is formed directly to lenses by using a highly precision-processed mold. Since it is not necessary to grind and polish lenses obtained by this method, the lenses can be manufactured at a low cost and within a short period of time. This forming method is called "glass molding" and studies and developments of this method have been made actively in recent years with resulting increase in aspherical lenses of optical elements made by glass molding. In addition to such application to aspherical lenses, glass molding is also attracting attention as a technique capable of forming articles of a fine shape accurately.

As glass used for glass molding, a glass which can be softened at a lower temperature is sought by reason of heat resistance of a mold used for glass molding. The glass transformation temperature Tg of prior art glasses comprising $SiO_2$, $B_2O_3$, $L_2O_3$ and $Li_2O$, however, generally exceeds 600° C. and no glass of this type of composition that sufficiently satisfies the heat resisting property of the mold used for glass molding has been provided in the past.

There is also a method of dripping molten glass from a glass flowing tube, receiving the dripping glass by a mold and cooling it to produce a glass gob. In the following description, a glass gob obtained by receiving molten glass dripped from a nozzle such as a platinum nozzle by a mold and cooling the received glass is simply called "gob". The obtained gob may be used directly as a preform or as a lens or may be ground and polished to a spherical or lens shape and used as a lens or a preform. In case a gob is used directly as a lens or a preform, care must be taken for surface roughness as well as for preventing flaws and dirt of the lens or preform.

A typical example of the method for producing such gob is disclosed by Japanese Patent Application Laid-open Publication No. Hei 6-122526 and Japanese Patent No. 2798208. In this method, molten glass tends to become elliptical in vertical section due to its self weight in a period of time from dripping of the molten glass to solidifying of the glass by cooling. Particularly in a case where a gob of a spherical shape having a diameter of a sphere exceeding 3 mm is to be obtained, the curvature of the upper surface of the gob tends to become large. On the other hand, there is a demand not only for a flat and thin gob but also for a thick gob having a nearly spherical shape. Particularly in a case where an optical element of a relatively small size having a diameter of sphere of less than 10 mm is to be obtained, demand for a thick gob as a preform of a spherical shape is large.

A flat gob can be easily controlled by providing a device for maintaining temperature after dripping of molten glass. On the other hand, for obtaining a spherical or thick gob, a cooling device is required. However, a glass for press molding having mean linear thermal expansion coefficient exceeding $85 \times 10^{-7}$ within a temperature range from 100° C. to 300° C. tends to cause cracking or breaking in the course of the quick cooling process due to the high expansion property of the glass. Moreover, stress tends to remain in the glass which will become a serious defect as an optical element.

It is also conceivable to obtain a gob under a high surface tension. For increasing the surface tension, it is necessary to obtain a gob at a low temperature. By reason of limitation by devitrification temperature and flow amount of glass, there is also limitation in adjustment of temperature.

Japanese Patent Application Laid-open Publication No. Hei 7-51446 discloses that a spherical gob can be produced by forming the recessed portion of a mold in the shape of a trumpet and optimizing a high pressure gas. Since, however, the gob is cooled quickly by the high pressure gas, the above described disadvantage arises.

Accordingly, it is generally practiced to cut sheet glass to cubic pieces and grind and polish the cubic pieces to obtain spherical gobs of a closely spherical shape. In this general method, however, yield of a gob from the sheet glass is 50% or lower and, therefore, it is disadvantageous from the standpoint of environmental protection and moreover it is difficult to realize production at a low cost in a short period of time. Further, in the polishing process, polishing flaws tend to take place in the gob. When such gob is used as a preform, the flaws remain in the preform after press molding and, therefore, such polishing flaws must be prevented.

As described above, various methods have been considered to obtain a gob having a nearly spherical shape but no study has been made so far to develop a gob from the standpoint of glass composition.

As glasses for press molding comprising $SiO_2$, $B_2O_3$, $La_2O_3$ and $Li_2O$ which is an object of the present invention, there have been disclosed several glasses. For example, Japanese Patent Application Laid-open Publications No. Sho 48-61517 and No. Sho 54-3115 disclose optical glasses which comprise $B_2O_3$ and $La_2O_3$ as essential components. In these glasses, however, emphasis is placed on improvement in chemical durability and resistance to devitrification and no consideration is given to hot-forming process. Since these glasses generally have a high glass transformation temperature Tg, the forming temperature during heat forming rises above 650° C. or over with resulting deterioration in a high precision mold and, therefore, these glasses are not suitable for press molding.

Japanese Patent Application Laid-open Publication No. Sho 59-146952 discloses a $B_2O_3$—$La_2O_3$—BaO—$R_2O$ (where R is an alkali metal element) glass comprising F component. It is difficult to obtain a homogeneous glass by this glass due to adverse influence caused by evaporation of the F component.

Japanese Patent Application Laid-open Publication No. Hei 8-259257 discloses a $SiO_2$—$B_2O_3$—ZnO—$La_2O_3$—

$Li_2O$ optical glass. For obtaining a glass having an Abbe number of 50 or over by this glass, devitrification temperature must exceed 1000° C. and, therefore, it is not suitable for a large scale production.

Japanese Patent No. 3377454 discloses a $SiO_2$—$B_2O_3$—$Y_2O_3$—$La_2O_3$—$Li_2O$—$Ta_2O_5$ optical glass for press molding. This glass, however, generally has an exceedingly high glass transformation temperature Tg and, besides, no consideration has been given to specific gravity. This glass therefore is not suitable for an optical glass for press molding which is an object of the present invention.

Japanese Patent Application Laid-open Publication No. 2004-2178 discloses a $SiO_2$—$B_2O_3$—$La_2O_3$—$Gd_2O_3$—$Li_2O$ optical glass for press molding. This glass, however, either has an exceedingly high glass transformation temperature Tg or has an exceedingly small specific gravity or has an exceedingly high devitrification temperature and, therefore, this glass is not suitable for an optical glass for press molding which is an object of the present invention.

Japanese Patent No. 3458462 discloses a $B_2O_3$—$Li_2O$—$La_2O_3$—$Gd_2O_3$ optical glass for press molding. This glass, however, generally has an exceedingly high glass transformation temperature Tg or has an exceedingly small Abbe number and, therefore, this glass is not suitable for an optical glass for press molding which is an object of the present invention.

Japanese Patent No. 3059719 discloses a $SiO_2$—$B_2O_3$—$Y_2O_3$—$La_2O_3$—$Li_2O$ optical glass. This glass, however, generally has an exceedingly high devitrification temperature or has an exceedingly small Abbe number or has an exceedingly large specific gravity and, therefore, this glass is not suitable for an optical glass for press molding which is an object of the present invention.

These publications are all insufficient in consideration as to how a low glass transformation temperature Tg should be realized. There have however been disclosed several optical glasses which have a low glass transformation temperature Tg.

For example, Japanese Patent Application Laid-open Publication No. 2003-176151 discloses an optical glass for press molding which has a low glass transformation temperature Tg. This glass, however, has an exceedingly high devitrification tendency or an exceedingly low specific gravity and, therefore, this glass is not suitable for an optical glass for press molding which is an object of the present invention.

Japanese Patent No. 2616958 discloses a $SiO_2$—$B_2O_3$—$La_2O_3$—$Gd_2O_3$—$Li_2O$ optical glass for precision press lenses. This glass, however, generally has an exceedingly high devitrification temperature or an exceedingly small Abbe number and, therefore, is not suitable for an optical glass which is an object of the present invention.

Japanese Patent No. 3423673 discloses a glass which has an exceedingly large specific gravity or an exceedingly small Abbe number and, therefore, this glass is not suitable for an optical glass for press molding which is an object of the present invention.

Japanese Patent No. 3015078 discloses a glass for precision press having a low glass transformation temperature Tg. This glass, however, has an exceedingly high devitrification temperature or an exceedingly large Abbe number and, therefore, this glass is not suitable for an optical glass for press molding which is an object of the present invention.

It is, therefore, an object of the present invention to provide a glass which has a sufficiently low devitrification temperature and a sufficiently small specific gravity for easily obtaining a spherical product by dripping from a flow tube and which has a sufficiently low glass transformation temperature Tg which is suitable for press molding.

SUMMARY OF THE INVENTION

For achieving the above described object of the invention, laborious studies and experiments made by the inventor of the present invention has resulted in the finding, which has led to the present invention, that, by adjusting the composition of a glass so that devitrification temperature will become 1000° C. or below and glass transformation temperature Tg will become 535° C. or below, a glass which is very suitable for press molding can be obtained. Further, the inventor's consideration and studies on relation between specific gravity and glass gob have resulted in the finding which has led to the present invention that, by adjusting specific gravity of the glass composition to the range from 3 to 4, a gob having a closely spherical shape can be easily obtained when necessary.

For achieving the above described object of the invention, in the first aspect of the invention, there is provided a glass composition having a devitrification temperature of 1000° C. or below, a glass transformation temperature (Tg) of 535° C. or below and a specific gravity within a range from 3 to 4.

In the second aspect of the invention, there is provided a glass composition as defined in the first aspect having a glass transformation temperature (Tg) of 500° C. or below.

In the third aspect of the invention, there is provided a glass composition as defined in the first or second aspect having a refractive index (nd) within a range from 1.60 to 1.75 and an Abbe number (vd) within a range from 50 to 60.

In the fourth aspect of the invention, there is provided a glass composition as defined in any of the first to third aspects comprising $SiO_2$, $B_2O_3$, $La_2O_3$ and $Li_2O$ wherein the ratio of $La_2O_3/Y_2O_3$ in mass % is within a range from 1.0 to 2.5 or the ratio of $La_2O_3/Gd_2O_3$ in mass % is within a range from 0.4 to 1.0 and a total amount in mass % of $SiO_2$, $B_2O_3$ and $Li_2O$ is within a range from 38 to 60%.

In the fifth aspect of the invention, there is provided a glass composition as defined in any of the first to fourth aspects comprising SrO as an essential ingredient.

In the sixth aspect of the invention, there is provided a glass composition as defined in any of the first to fifth aspects comprising in mass % calculated on oxide basis

| | |
|---|---|
| $SiO_2$ | 5-18% and/or |
| $B_2O_3$ | 22-40% and/or |
| $La_2O_3$ | 10-20% and/or |
| $ZrO_2$ | 0.5-7% and/or |
| SrO | 0.5-15% and/or |
| $Li_2O$ | 2.5-13%. |

In the seventh aspect of the invention, there is provided a glass composition as defined in any of the first to sixth aspects comprising in mass % calculated on oxide basis

| | |
|---|---|
| Gd$_2$O$_3$ | 4-30%. |

In the eighth aspect of the invention, there is provided a glass composition as defined in any of the first to seventh aspects comprising in mass % calculated on oxide basis

| | |
|---|---|
| Y$_2$O$_3$ | 4-20%. |

In the ninth aspect of the invention, there is provided a glass composition as defined in any of the first to eighth aspects comprising in mass % calculated on oxide basis

| | |
|---|---|
| CaO | 0-15% and/or |
| BaO | 0-15% and/or |
| ZnO | 0-15% and/or |
| Na$_2$O | 0-5% and/or |
| K$_2$O | 0-5%. |

In the tenth aspect of the invention, there is provided a glass composition as defined in any of the first to ninth aspects wherein a total amount in mass % of CaO and BaO is within a range from 1% to less than 10%.

In the eleventh aspect of the invention, there is provided a glass composition as defined in any of the first to tenth aspects comprising in mass % calculated on oxide basis

| | |
|---|---|
| TiO$_2$ | 0-3% and/or |
| Nb$_2$O$_5$ | 0-3% and/or |
| Ta$_2$O$_5$ | 0-5% and/or |
| WO$_3$ | 0-5% and/or |
| MgO | 0-3% and/or |
| GeO$_2$ | 0-10% and/or |
| Al$_2$O$_3$ | 0-5% and/or |
| Yb$_2$O$_3$ | 0-10% and/or |
| Sb$_2$O$_3$ | 0-10%. |

In the twelfth aspect of the invention, there is provided a glass composition as defined in any of the first to eleventh aspects having an abrasion Aa of 100 or over.

In the thirteenth aspect of the invention, there is provided a glass composition as defined in any of the first to twelfth aspects wherein, in a case where a preform having a diameter calculated as being converted to a sphere of 9 mm or over is provided directly by cooling a molten gob, the ratio of radius of curvature of the upper surface of the preform to the diameter calculated as being converted to a sphere is 1.1 or below.

In the fourteenth aspect of the invention, there is provided a preform for press molding made of a glass composition as defined in any of the first to thirteenth aspects.

In the fifteenth aspect of the invention, there is provided an optical element made by forming and processing a preform as defined in the fourteenth aspect.

In the sixteenth aspect of the invention, there is provided an optical element made by forming and processing a glass composition as defined in any of the first to twelfth aspects.

According to the invention, there is provided a glass which has a sufficiently low devitrification temperature and a sufficiently small specific gravity for easily obtaining a spherical product by dripping from a flow tube and which has a sufficiently low glass transformation temperature Tg for press molding.

DESCRIPTION OF PREFERRED EMBODIMENTS

Reasons for limiting the values of the properties of the glass composition made according to the present invention will now be described.

As materials used for a glass for press molding, a material having glass transformation temperature Tg (hereinafter abbreviated as "Tg") of 600° C. or over requires a high temperature in the press molding processing with resulting deterioration of a mold and a film formed on the mold. In order to prevent deterioration of the mold, it is preferable to use a material having a Tg of 580° C. or below.

In producing a product such as a convex lens for which press molding can be carried out relatively easily, the above described Tg of 580° C. or below will suffice but when press molding is carried out for producing a concave lens demand for which is increasing or other products having a fine shape, it is necessary to reduce Tg to 535° C. or below and, more preferably, to 500° C. or below. Such glass composition having a Tg of 535° C. or below is preferable also in producing a product such as a convex lens because such composition will prolong the life of the mold and film formed thereon.

On the other hand, if the composition is adjusted so that Tg will be reduced to less than 450° C., crystals tend to precipitate due to drop in viscosity and, as a result, the glass tends to become opaque. This will result in deterioration in productivity of the glass production.

Accordingly, as a glass for press molding, the upper limit of Tg should preferably be 535° C. and, more preferably, be 500'. In a case where durability of the glass itself is important, the lower limit of Tg should preferably be 450° C. and, more preferably, be 470° C.

In the glass composition of the present invention, the upper limit of devitrification temperature should preferably be 1000° C., more preferably be 930° C. and most preferably be 900° C. for realizing stable production. Such glass composition can be manufactured in the manner to be described later. By lowering the glass forming temperature, thermal load applied to the glass forming device can be mitigated and, as a result, the life of the glass forming device can be prolonged whereby the manufacturing cost can be reduced and an adverse effect to the environment can be prevented. Further, if the devitrification temperature is low, a gob will be obtained in a high viscosity state.

In this specification, "devitrification temperature" is an index which indicates a lower limit temperature in the glass forming process and devitrification temperature is measured by presence or absence of crystals precipitating when the glass is held for a predetermined period of time.

As described above, the glass of the present invention can be used either for producing a preform for press molding or for directly pressing molten glass. In case the glass is used as a preform material, the method for producing the preform and the method for press molding the preform are not limited but any known method for production or press molding can be used. For manufacturing a preform material, the method and apparatus for manufacturing glass press products are disclosed by Japanese Patent Application Laid-open Publication No. Hei 06-157051 and the method and apparatus for manufacturing an optical glass are disclosed by Japanese Patent Application Laid-open Publication No. Hei 11-157849.

A preform may be obtained not only by molten glass directly as described above but also may be formed by grinding and polishing a formed glass gob or block and press molding the polished gob.

For the purpose of obtaining a closely spherical gob directly from molten glass as described above, gob forming tests have been repeated and, as a result, an optimum range of glass composition has been found. It has also been found that, when specific gravity of the glass is 4.0 or below, a gob having a closely spherical shape can be easily obtained. If, on the other hand, the specific gravity of the gob is less than 3.0, cycle of dripping molten glass becomes short with resulting necessity for raising the forming temperature. This increases thermal load applied to the forming device. Accordingly, the lower limit of the specific gravity should preferably be 3.0, more preferably be 3.1 and, most preferably, be 3.2 whereas the upper limit of the specific gravity should preferably be 4.0, more preferably be 3.8 and, most preferably, be 3.6. Although specific gravity of molten glass during forming is different from specific gravity of the glass at room temperature, there is correlation between them and, therefore, specific gravity of the glass at room temperature is used in this specification.

For obtaining a glass preform from molten glass, other factors, e.g., surface tension, wettability between the gob and the mold and viscosity in the liquidus temperature, must also be considered. However, by adjusting the specific gravity to the above described range, the glass composition having the above described composition can be formed to a preform having a more closely spherical shape than a glass composition having a specific gravity which is not within the above described range.

If the glass of the present invention having a refractive index of less than 1.60 is used for producing a lens, radius of curvature of the lens tends to become small and spherical aberration thereby tends to increase. If the refractive index is higher than 1.75, amounts of $SiO_2$ and $B_2O_3$ which are glass forming components must be reduced with resulting difficulty in maintaining devitrification temperature at 950° C. or below.

Therefore, the lower limit of refractive index should preferably be 1.600, more preferably be 1.630 and, most preferably be 1.655 whereas the upper limit of refractive index should preferably be 1.750, more preferably be 1.700 and, most preferably be less than 1.675.

If Abbe number of the glass is 60 or over, amounts of $SiO_2$ and $B_2O_3$ which are glass forming components and $Li_2O$ which is a component which is effective for lowering Tg must be reduced and it becomes difficult to realize liquidus temperature of 950° C. or below or Tg of 600° C. or below and, as a result, it becomes difficult to obtain a glass which is an object of the present invention. If Abbe number of the glass is less than 50, chromatic aberration increases and it becomes difficult to use this glass as an optical element utilizing low dispersion property. Therefore, the lower limit of Abbe number should preferably be 50, more preferably be 52 and, most preferably be 55 whereas the upper limit of Abbe number should preferably be 60, more preferably be 58 and, most preferably be 56.

In this specification, the term "flatness" is used as an index indicating how closely spherical the shape of the gob is. More specifically, flatness is expressed by ratio $R/\phi$, i.e., ratio of radius of curvature R of the upper surface of a gob shape obtained to a diameter $\phi$ calculated as being converted to a sphere of the gob shape. Therefore, the larger the "flatness" of the gob is, the more distorted in an elliptical shape in vertical section the gob is. The gob for evaluating "flatness" is provided by the method described in Japanese Patent No. 2798208. In using this method, there is no particular limitation in the radius of curvature of a receiving mold for receiving molten glass which can emit gas, but preferable radius of curvature of this receiving mold is about $\phi 0.5$-30 mm. By adopting this radius of curvature, the lower surface R can be controlled easily.

In this specification, "diameter calculated as being converted to a sphere" $\phi$ means a diameter of sphere when the gob is converted to a sphere on the basis of the volume of the gob. In an ideal sphere, $R/\phi$ becomes 0.5. In case a gob is obtained in the glass composition of the present invention, $\phi$ should preferably be within a range from 0.1 mm to 20 mm.

The glass composition of the present invention is advantageous in that, in a case where a preform having a diameter calculated as being converted to a sphere is 9 mm or over is produced directly by cooling a molten glass gob, the preform can be produced with the ratio of radius of curvature of the upper surface of the preform to the diameter calculated as being converted to a sphere being 1.1 or below.

As described above, when a product of a spherical shape is needed, it is desirable to obtain a gob having a closely spherical shape directly from molten glass of the glass composition of the present invention. There is, however, a case where it is necessary to process a gob to a spherical shape by grinding or polishing. If, in such a case, a processing such as polishing can be made easily, it will be advantageous from the standpoints of improving yield of the material and shortening of processing time.

The term "abrasion" in the present specification is an index indicating work efficiency in the grinding and polishing processes. A glass having a small degree of abrasion means that it takes long time in the grinding and polishing processes. In a case, therefore, where a preform is to be obtained by grinding and polishing a glass gob or block, the degree of abrasion should preferable be 100 or over. Therefore, the lower limit of the degree of abrasion should preferably be 100, more preferably be 110 and, most preferably be 115.

The term "coloration" in the present specification is an index indicating transparency in the visible region which is measured by the method of measuring the degree of coloring of an optical glass in accordance with JOGIS02$^{-2003}$ and is expressed by transmission wavelengths including reflection of 80% and 5%. The smaller this value is, the better light transmittance the glass has and therefore is the more suitable for an optical material. In the glass composition of the present invention, the upper limit of 5% transmission wavelength should preferably be 350 nm, more preferably be 330 nm and, most preferably be 310 nm. The upper limit of 80% transmission wavelength should preferably be 420 nm, more preferably be 390 nm and, most preferably be 370 nm.

Reasons for limiting the composition ranges of the respective components of the glass composition of the present invention in mass % calculated on oxide basis to the above described ranges will now be described.

In the present specification, the term "comprising, calculated on oxide basis" means that, assuming that oxides, carbonates, nitrates etc. which are used as raw materials of the glass composition of the optical glass of the present invention have all been decomposed and converted to oxides during the melting process, each component of the glass comprises a particular ratio to the total weight of the converted oxides which is 100 mass %.

In the present specification, the term "be substantially free" means that a particular material is not included as a component of raw materials, that is, the material is not intentionally added. This term therefore does not exclude a case where such material is mixed as an impurity in the glass composition.

$SiO_2$ is a glass forming oxide and is a component which is effective for improving resistance to devitrification and chemical durability. For maintaining these effects, it is necessary to add this component in an amount of 5.0% or over. If, however, the amount of this component is excessive, it becomes difficult to maintain either or both of refractive index of 1.60 or over and Tg of 535° C. or below. Therefore, the lower limit of this component should preferably be 5.0%, more preferably be 6.0% and, most preferably be 7.0% and the upper limit of this amount should preferably 18.0%, more preferably be 16.5% and, most preferably be less than 11.5%.

$B_2O_3$ is an essential component as a glass forming oxide in the glass composition of the present invention which comprises a large amount of rare earth oxides. If the amount of this component is insufficient, this effect becomes insufficient whereas if the amount of this component is excessive, it becomes difficult to maintain either or both of refractive index of 1.60 or over and Tg of 535° C. or below. Therefore, the lower limit of this component should preferably be 22%, more preferably be 24% and, most preferably be 30% and the upper limit of this amount should preferably be 40%, more preferably be 35% and, most preferably be 33%.

$Li_2O$ is a component which is very effective for lowering devitrification temperature and lowering Tg. This component, together with $SiO_2$ and $B_2O_3$, is also effective for reducing specific gravity. If the amount of this component is insufficient, these effects become insufficient whereas if the amount of this component is excessive, devitrification temperature rises rather than falls with resulting difficulty in vitrifying of raw materials. Therefore, the lower limit of this component should preferably be 2.5%, more preferably be 3.0% and, most preferably be 7.0% and the upper limit of this amount should preferably 13%, more preferably be 11% and, most preferably be 10%.

$Na_2O$ or $K_2O$ is effective for lowering Tg. If the amount of either component is excessive, devitrification temperature rises with resulting difficulty in vitrifying of raw materials. Therefore, the upper limit of this component should be 5.0%, more preferably be 3.0% and, most preferably be 1.0%.

$SiO_2$, $B_2O_3$ and $Li_2O$ are components which reduce specific gravity and thereby making a gob of a more closely spherical shape of a gob which is an important feature of the present invention. If the sum of amounts of these three components is insufficient, it becomes difficult to hold specific gravity to 4 or below whereas if the sum of amount of these components is excessive, specific gravity becomes less than 3.0 and, as described above, productivity is deteriorated. For maintaining specific gravity of the glass composition within a range from 3.0 to 4.0, the lower limit of this sum should preferably be 38%, more preferably be 39% and, most preferably be 40% and the upper limit of this sum should preferably be 60%, more preferably be 55% and, most preferably be 50%.

$La_2O_3$ is a component which is effective for improving refractive index of the glass and increasing Abbe number. If the amount of this component is insufficient, it becomes difficult to maintain values of optical constants within the above described specific ranges whereas if the amount of this component is excessive, it becomes difficult to maintain devitrification temperature at 950° C. or below. Therefore, the lower limit of this component should preferably be 10%, more preferably be 11% and, most preferably be 12% and the upper limit of this amount should preferably be 20%, more preferably be less than 18% and, most preferably be less than 16%.

$Gd_2O_3$ is a component which, in cooperation with $La_2O_3$, is effective for lowering liquidus temperature while maintaining the above described optical constants. If the amount of this component is insufficient, it becomes difficult to maintain values of the optical constants within the above described ranges whereas if the amount of this component is excessive, liquidus temperature rises excessively. Therefore, the lower limit of this component should preferably be 4%, more preferably be 10% and, most preferably be 13% and the upper limit of this amount should preferably 30%, more preferably be 27% and, most preferably be 23%.

$Y_2O_3$ may be substituted for $Gd_2O_3$ for exhibiting the same effects as $Gd_2O_3$. If the amount of this component is insufficient, these effects become insufficient whereas if the amount of this component is excessive, devitrification temperature rises excessively. Therefore, the lower limit of this component should preferably be 4%, more preferably be 6% and, most preferably be 8% and the upper limit of this amount should preferably 20%, more preferably be 17% and, most preferably be less than 14%.

Studies have been made about various combinations of $La_2O_3$, $Gd_2O_3$ and $Y_2O_3$ and, as a result, it has been found that significantly excellent resistance to devitrification can be achieved if the ratio in mass % of $La_2O_3/Y_2O_3$ is within a range from 1.0 to 2.5 or the ratio in mass % of $La_2O_3/Gd_2O_3$ is within a range from 0.4 to 1.0 and, therefore, a glass in which resistance to devitrification is not deteriorated notwithstanding that the glass contains a relatively large amount of $Li_2O$ can be obtained. If these ratios are both outside of these strictly limited specific ranges, it becomes difficult to maintain devitrification temperature at 950° C. or below particularly under the condition of Tg being 535° C. or below.

In a case where the ratio of $La_2O_3/Y_2O_3$ is within a range from 1.0 to 2.5, $Gd_2O_3$ may be added in an amount up to 5% and in a case where the ratio of $La_2O_3/Gd_2O_3$ is within a range from 0.4 to 1.0, $Y_2O_3$ may be added in an amount up to 5%.

$ZrO_2$ is a component which is effective for lowering devitrification temperature and thereby preventing crystallization and also improving chemical durability, if a small amount of this component is added. If the amount of this component is insufficient, these effects become insufficient whereas if the amount of this component is excessive, liquidus temperature rises excessively and it becomes difficult to maintain Tg at 535° C. or below. Therefore, the lower limit of this component should preferably be 0.5%, more preferably be 1.0% and, most preferably be 1.5% and the upper limit of this amount should preferably 7.0%, more preferably be 4.0% and, most preferably be 2.0%.

$Al_2O_3$ has effects similar to $ZrO_2$. If the amount of this component is excessive, it becomes difficult to vitrify raw materials and Tg rises also. Therefore, this component may be added with the upper limit being preferably 5%, more preferably 3.0% and, most preferably 1.5%.

$TiO_2$ is a component which is very effective for achieving a high refractive index and also is effective for lowering devitrification temperature by adding a small amount of this component. If, however, the amount of this component is excessive, transmittance of the glass is deteriorated. Therefore, this component may be added with the upper limit being preferably 3.0%, more preferably 2.0% and, most preferably less than 1.0%.

$Nb_2O_5$ is a component which is very effective for achieving a high refractive index and lowering devitrification temperature. If, however, the amount of this component is excessive, Abbe number decreases. Therefore, this component may be added with the upper limit being preferably 3.0%, more preferably be 2.0% and, most preferably be 1.0%.

$Ta_2O_5$ is a component which is very effective for increasing refractive index and lowering devitrification temperature. If, however, the amount of this component exceeds 5%, Abbe number decreases. Therefore, this component may be added with the upper limit being preferably 5%, more preferably 3.0% and, most preferably 2.0%.

$WO_3$ is a component which is effective for lowering Tg and also lowering devitrification temperature while maintaining refractive index. If, however, the amount of this component is excessive, Abbe number decreases. Therefore, this component may be added within a range of 0-5% with the upper limit being preferably 5%, more preferably 3.0% and, most preferably 2.0%.

$Yb_2O_3$ is a component which, like $La_2O_3$, is effective for increasing refractive index and increasing Abbe number. If, however, the amount of this component is excessive, resistance to devitrification is deteriorated. Therefore, this component may be added with the upper limit being preferably 10%, more preferably 5.0% and, most preferably less than 3.0%.

$GeO_2$ is a component which is effective for increasing refractive index and improving resistance to devitrification. Since, however, a raw material of this component is expensive, the amount of use of this component is limited. Therefore, this component may be added with the upper limit being preferably 10%, more preferably 5% and, most preferably less than 3%.

ZnO is a component which is effective for lowering devitrification temperature and lowering Tg and specific gravity. If, however, the amount of this component is excessive, chemical durability is deteriorated. Therefore, this component may be added with the upper limit being preferably 15%, more preferably 13% and, most preferably 7%.

CaO is a component which, like ZnO, is effective for lowering devitrification temperature and lowering Tg and specific gravity. If, however, the amount of this component is excessive, resistance to devitrification is deteriorated. Therefore, this component may be added with the upper limit being preferably 15%, more preferably 12% and, most preferably 6%.

BaO is a component which is effective for lowering devitrification temperature and adjusting optical constants. If the amount of this component is excessive, resistance to devitrification is deteriorated. Therefore, this component may be added with the upper limit being preferably 15%, more preferably 10% and, most preferably 5%.

SrO is a component which is effective for lowering devitrification temperature and also is very effective for increasing Abbe number. If the amount of this component is excessive, resistance to devitrification is deteriorated. Therefore, the upper limit of this component should preferably be 15%, more preferably be 14% and, most preferably be 13% and the lower limit of this amount should preferably 0.5%, more preferably be more than 3.0% and, most preferably be more than 10%.

MgO is a component which is effective for lowering melting temperature. If the amount of this component exceeds 5%, stability for devitrification is deteriorated and phase separation tendency increases. Therefore, the upper limit of the amount of this component should preferably be 5%, more preferably be 2% and, most preferably should not be substantially contained.

$Sb_2O_3$ may be added for it has a refining effect in melting of the glass. The amount of this component should preferably be less than 10%.

F is a component which is effective for increasing Abbe number and lowering Tg. If the amount of this component is excessive, this component evaporates from the surface of the glass in forming of the glass and is deposited on the preform or mold with resulting occurrence of defects in a lens produced. F component causes also an inhomogeneous portion in the interior or on the surface of the glass due to evaporation which makes the glass unsuitable for an optical element. This component, therefore, may be added with the upper limit being preferably 10%, more preferably 5.0% and, most preferably 3.0%.

$Cs_2O$ may be added for adjusting optical constants but, since raw materials of this component are expensive, this component is not preferable when a glass of a low price should be produced.

$Bi_2O_3$ and $TeO_2$ may be added for achieving a high refractive index and low Tg. In a case where addition of these components is likely to cause fogging on the surface of a lens due to evaporation of these components in press molding of the lens, these components preferably should not be added.

Transition metal components such as V, Cr, Mn, Fe, Co, Ni, Cu and Mo excluding Ti absorb wavelengths in a specific part of the visible region and, therefore, addition of these components, even in a very small amount, tend to color the glass. Accordingly, in a case where the optical glass of the present invention uses wavelengths in the visible region, the optical glass should be substantially free of these components.

Pb and Th may be added for increasing refractive index and improving stability of the glass. Cd and Tl may also be added for lowering Tg. As may also be added for refining and homogenizing the glass. There is however tendency toward refraining from using Pb, Th, Cd, Tl and As as harmful chemical substance and steps for environmental protection must be taken not only in the glass manufacturing process but also in processing of glass and disposal of glass after production. For this reason, these components preferably should not be added.

Since the glass composition of the present invention is expressed in mass %, it cannot be directly expressed in mol %. A composition expressed in mol % of respective oxides existing in the glass composition satisfying the properties required by the present invention generally assumes the following values. The following expression in mol %, however, is made for convenience of reference and in no way limits the scope of the embodiments of the invention.

| | |
|---|---|
| $SiO_2$ | 7-25 mol % |
| $B_2O_3$ | 28-42 mol % |
| $Li_2O$ | 8-25 mol % |
| $La_2O_3$ | 2-5 mol % |
| $Gd_2O_3$ | 0-5 mol % |
| $Y_2O_3$ | 0-5 mol % |
| $TiO_2$ | 0-3 mol % |
| $ZrO_2$ | 0.5-2 mol % |
| $Nb_2O_5$ | 0-2 mol % |
| $Ta_2O_5$ | 0-2 mol % |
| $WO_3$ | 0-3 mol % |
| RO (where R is Mg, Ca, Sr, Ba and Zn) | 0-20 mol % |
| $Sb_2O_3$ | 0-3 mol % |

EXAMPLES

Tables 1 to 24 show compositions of Examples No. 1 to No. 60 of the present invention and Comparative Examples No. A to No. F which are glasses of the known glass comprising $SiO_2$, $B_2O_3$, $La_2O_3$ and $Li_2O$ together with optical constants (nd, vd), glass transformation temperature Tg, yield point At, coefficient α of linear thermal expansion, devitrification temperature and specific gravity.

For manufacturing the glasses of Examples No. 1 to No. 60, ordinary raw materials for an optical glass including oxides, carbonates and nitrates were weighed and mixed so as to realize the composition ratio of the respective examples shown in Tables 1 to 24. The raw materials were put in a platinum crucible and melted at a temperature within a range from 1200° C. to 1400° C. for two to four hours depending upon the melting property of the composition. After refining and stirring the melt for homogenization, the melt was cast into a mold and annealed and homogeneous glasses were thus provided easily.

Degree of abrasion Aa was measured in accordance with Japan Optical Glass Industry Association Standard JOGIS10[-1994] Measuring Method of Degree of Abrasion of Optical Glass.

The mean coefficient of linear thermal expansion α (100° C. to 300° C.) was measured in the temperature range from 100° C. to 300° C. in accordance with the measuring method of Japan Optical Glass Industry Association Standard JOGIS08[-2003] Measuring Method of Thermal Expansion of Optical Glass.

Devitrification temperature was measured in the following manner. Cullet glass of 30 ml was placed in a platinum crucible having a capacity of 50 ml and melted at 1200° C. to 1300° C. for two hours. The temperature was lowered at a rate of 6° C. to 10° C. per minute and thereafter the glass was held at a predetermined temperature for 6 hours. Then, the glass was taken out of the furnace and presence or absence of crystals in the glass was observed by a microscope. The highest temperature at which presence of crystal was observed was determined as devitrification temperature.

Degree of coloring was measured by using a test piece polished to thickness of 10 mm, measuring transmittance including reflection, and expressing transmittance by rounding off the number of units of transmission wavelengths at 5% and 80% in accordance with Japan Optical Glass Industry Association Standard JOGIS02[-2003] Measuring Method of Degree of Coloring of Optical Glass.

Specific gravity was measured in accordance with Japan Optical Glass Industry Association Standard JOGIS05[-1975] Measuring Method of Specific Gravity of Optical Glass.

TABLE 1

| | Examples (mass %) | | | | | |
|---|---|---|---|---|---|---|
| No. | 1 | 2 | 3 | 4 | 5 | 6 |
| $SiO_2$ | 5.00 | 9.80 | 13.54 | 14.54 | 12.54 | 12.54 |
| $B_2O_3$ | 38.08 | 24.60 | 26.11 | 26.11 | 26.11 | 26.11 |
| $Li_2O$ | 4.25 | 4.00 | 4.36 | 4.36 | 3.36 | 3.36 |
| $SiO_2 + B_2O_3 + Li_2O$ | 47.33 | 38.40 | 44.01 | 45.01 | 42.01 | 42.01 |
| $Y_2O_3$ | 6.00 | 10.00 | 10.00 | 13.00 | 10.00 | 10.00 |
| $La_2O_3$ | 25.60 | 23.60 | 17.41 | 14.41 | 17.41 | 17.41 |
| $Gd_2O_3$ | | | | | | |
| $La_2O_3/Y_2O_3$ | 4.27 | 2.36 | 1.74 | 1.11 | 1.74 | 1.74 |
| $La_2O_3/Gd_2O_3$ | | | | | | |
| $TiO_2$ | 0.05 | | | | | |
| $ZrO_2$ | 6.00 | 6.00 | 3.48 | 3.48 | 3.48 | 3.48 |
| $Nb_2O_5$ | | 0.50 | 0.14 | 0.14 | 0.14 | 0.14 |
| $Ta_2O_5$ | | 9.00 | 3.96 | 3.96 | 3.96 | 1.96 |
| $WO_3$ | | | | | 3.54 | |
| ZnO | 15.00 | 5.50 | 7.54 | 4.54 | | 5.54 |
| CaO | | 5.00 | 3.54 | 3.54 | 3.54 | 3.54 |
| BaO | | 2.00 | 6.32 | 8.32 | 9.32 | 9.32 |
| SrO | | | 3.60 | 3.60 | 6.60 | 6.60 |
| $Sb_2O_3$ | 0.02 | 0.05 | | | | |
| Total | 100.00 | 100.05 | 100.00 | 100.00 | 100.00 | 100.00 |

TABLE 2

| | Examples (mass %) | | | | | |
|---|---|---|---|---|---|---|
| No. | 1 | 2 | 3 | 4 | 5 | 6 |
| nd | 1.69181 | 1.73184 | 1.69248 | 1.68895 | 1.69584 | 1.69362 |
| νd | 53.1 | 48.8 | 52.5 | 52.9 | 52.6 | 53.0 |
| Tg (° C.) | 529 | 535 | 526 | 515 | 520 | 535 |
| At (° C.) | 564 | 578 | 571 | 571 | 575 | 582 |
| α ($10^{-7}$/° C.) | 82 | 83 | 88 | 92 | 90 | 88 |
| Devitrification temperature (° C.) | 820 | | 780 | | | 850 |
| Specific gravity | 3.73 | 3.90 | 3.60 | 3.65 | 3.69 | 3.68 |

TABLE 3

| | Examples (mass %) | | | | | |
|---|---|---|---|---|---|---|
| No. | 7 | 8 | 9 | 10 | 11 | 12 |
| $SiO_2$ | 12.54 | 12.54 | 12.84 | 11.84 | 15.84 | 12.54 |
| $B_2O_3$ | 26.11 | 26.11 | 27.11 | 30.11 | 24.61 | 25.61 |
| $Li_2O$ | 3.36 | 4.36 | 4.36 | 3.36 | 3.86 | 3.86 |
| $SiO_2 + B_2O_3 + Li_2O$ | 42.01 | 43.01 | 44.31 | 45.31 | 44.31 | 42.01 |
| $Y_2O_3$ | 10.00 | 8.00 | 10.00 | 13.00 | 10.00 | 10.00 |
| $La_2O_3$ | 17.41 | 19.41 | 17.41 | 14.41 | 17.41 | 17.41 |
| $Gd_2O_3$ | | | | | | |
| $La_2O_3/Y_2O_3$ | 1.74 | 2.43 | 1.74 | 1.11 | 1.74 | 1.74 |
| $La_2O_3/Gd_2O_3$ | | | | | | |
| $TiO_2$ | | | | | | 0.14 |
| $ZrO_2$ | 2.48 | 3.20 | 3.48 | 3.48 | 3.48 | 2.48 |
| $Nb_2O_5$ | 0.14 | 0.14 | 0.14 | 0.14 | 0.14 | |
| $Ta_2O_5$ | 1.96 | 3.40 | 3.96 | 3.96 | 3.96 | 1.96 |
| $WO_3$ | | | | | | |
| ZnO | 6.54 | 4.38 | 6.24 | 9.24 | 6.24 | 6.54 |
| CaO | 3.54 | 3.54 | 3.54 | 3.54 | 3.54 | 3.54 |
| BaO | 9.32 | 9.32 | 9.32 | 5.32 | 9.32 | 9.32 |
| SrO | 6.60 | 6.60 | 1.60 | 1.60 | 1.60 | 6.60 |
| $Sb_2O_3$ | 0.03 | 0.03 | 0.03 | 0.05 | | 0.03 |
| Total | 100.03 | 101.03 | 100.03 | 100.05 | 100.00 | 100.03 |

TABLE 5

| | Examples (mass %) | | | | | |
|---|---|---|---|---|---|---|
| No. | 13 | 14 | 15 | 16 | 17 | 18 |
| $SiO_2$ | 10.54 | 10.00 | 10.00 | 11.00 | 8.40 | 6.40 |
| $B_2O_3$ | 26.11 | 24.50 | 28.00 | 26.00 | 28.00 | 30.00 |
| $Li_2O$ | 3.36 | 4.00 | 3.50 | 3.50 | 3.50 | 3.50 |
| $SiO_2 + B_2O_3 + Li_2O$ | 40.01 | 38.50 | 41.50 | 40.50 | 39.90 | 39.90 |
| $Y_2O_3$ | 10.00 | 10.00 | 10.00 | 10.00 | 10.00 | 10.00 |
| $La_2O_3$ | 12.41 | 20.00 | 15.50 | 17.40 | 15.40 | 15.40 |
| $Gd_2O_3$ | | | | | | |
| $La_2O_3/Y_2O_3$ | 1.24 | 2.00 | 1.55 | 1.74 | 1.54 | 1.54 |
| $La_2O_3/Gd_2O_3$ | | | | | | |
| $Al_2O_3$ | | | | | | |
| $ZrO_2$ | 2.48 | 1.50 | 2.50 | 1.50 | 1.50 | 1.50 |
| $Nb_2O_5$ | 0.14 | | | | | |
| $Ta_2O_5$ | 1.96 | | 2.00 | | | |
| $WO_3$ | | | | | | |
| ZnO | 8.54 | 12.00 | 9.00 | 11.00 | 13.60 | 13.60 |
| CaO | 3.54 | 3.00 | 4.00 | 3.60 | 3.60 | 3.60 |
| BaO | 14.32 | 9.00 | 9.00 | 10.00 | 10.00 | 10.00 |
| SrO | 6.60 | 6.00 | 6.50 | 6.00 | 6.00 | 6.00 |
| $Sb_2O_3$ | 0.03 | 0.03 | 0.03 | 0.03 | 0.03 | 0.03 |
| Total | 100.03 | 100.03 | 100.03 | 100.03 | 100.03 | 100.03 |

TABLE 4

| | Examples (mass %) | | | | | |
|---|---|---|---|---|---|---|
| No. | 7 | 8 | 9 | 10 | 11 | 12 |
| nd | 1.69186 | 1.6894 | 1.69115 | 1.68966 | 1.69121 | 1.69177 |
| νd | 53.2 | 53 | 52.7 | 52.6 | 52.6 | 53.0 |
| Tg (° C.) | 532 | 532 | 529 | 535 | 530 | 528 |
| At (° C.) | 577 | 575 | 572 | 581 | 578 | 575 |
| α ($10^{-7}$/° C.) | 89 | 92 | 82 | 79 | 92 | 92 |
| Devitrifacation temperature (° C.) | 860 | 780 | 830 | 810 | 820 | 810 |
| Specific gravity | 3.67 | 3.66 | 3.67 | 3.68 | 3.73 | 3.71 |

TABLE 6

| No. | 13 | 14 | 15 | 16 | 17 | 18 |
|---|---|---|---|---|---|---|
| nd | 1.69028 | 1.69939 | 1.69137 | 1.69145 | 1.69103 | 1.69095 |
| νd | 52.7 | 52.1 | 53 | 53.1 | 52.9 | 53.1 |
| Tg (° C.) | 515 | 498 | 522 | 514 | 498 | 495 |
| At (° C.) | 560 | 551 | 566 | 557 | 550 | 543 |
| α (10$^{-7}$/° C.) | 90 | 95 | 90 | 91 | 93 | 95 |
| Devitrification temperature (° C.) | | 920 | 910 | 830 | 850 | 850 |
| Specific gravity | 3.70 | 3.80 | 3.73 | 3.71 | 3.69 | 3.68 |

TABLE 7

Examples (mass %)

| No. | 19 | 20 | 21 | 22 | 23 | 24 |
|---|---|---|---|---|---|---|
| $SiO_2$ | 10.50 | 11.00 | 12.50 | 12.50 | 12.20 | 10.70 |
| $B_2O_3$ | 26.20 | 26.00 | 26.00 | 26.00 | 26.00 | 27.50 |
| $Li_2O$ | 3.50 | 3.50 | 3.50 | 3.50 | 3.50 | 3.50 |
| $SiO_2 + B_2O_3 + Li_2O$ | 40.20 | 40.50 | 42.00 | 42.00 | 41.70 | 41.70 |
| $Y_2O_3$ | 10.00 | 10.00 | 10.00 | 10.00 | 10.00 | 10.00 |
| $La_2O_3$ | 17.00 | 17.40 | 17.00 | 17.00 | 17.00 | 17.00 |
| $Gd_2O_3$ | | | | | | |
| $La_2O_3/Y_2O_3$ | 1.70 | 1.74 | 1.70 | 1.70 | 1.70 | 1.70 |
| $La_2O_3/Gd_2O_3$ | | | | | | |
| $Al_2O_3$ | | | | | | |
| $ZrO_2$ | 1.00 | 1.50 | 2.50 | 2.50 | 2.50 | 2.50 |
| $Nb_2O_5$ | | | | | | |
| $Ta_2O_5$ | 1.10 | | 2.00 | 2.00 | 2.00 | 2.00 |
| $WO_3$ | | | | | | |
| ZnO | 9.50 | 11.00 | 6.00 | 9.00 | 6.00 | 6.00 |
| CaO | 5.50 | 3.60 | 5.50 | 2.50 | 5.50 | 5.50 |
| BaO | 9.50 | 10.00 | 9.00 | 9.00 | 9.30 | 9.30 |
| SrO | 6.20 | 6.00 | 6.00 | 6.00 | 6.00 | 6.00 |
| $Sb_2O_3$ | 0.03 | 0.03 | 0.03 | 0.03 | 0.03 | 0.03 |
| Total | 100.03 | 100.03 | 100.03 | 100.03 | 100.03 | 100.03 |

TABLE 9

Examples (mass %)

| No. | 25 | 26 | 27 | 28 | 29 | 30 |
|---|---|---|---|---|---|---|
| $SiO_2$ | 12.20 | 11.00 | 12.20 | 11.00 | 12.20 | 15.00 |
| $B_2O_3$ | 25.60 | 26.00 | 25.60 | 34.00 | 32.60 | 26.00 |
| $Li_2O$ | 3.50 | 4.50 | 5.50 | 4.50 | 5.50 | 6.50 |
| $SiO_2 + B_2O_3 + Li_2O$ | 41.30 | 41.50 | 43.30 | 49.50 | 50.30 | 47.50 |
| $Y_2O_3$ | 10.00 | 10.00 | 10.00 | 10.00 | 10.00 | 10.00 |
| $La_2O_3$ | 17.40 | 17.40 | 17.40 | 17.40 | 17.40 | 15.00 |
| $Gd_2O_3$ | | | | | | |
| $La_2O_3/Y_2O_3$ | 1.74 | 1.74 | 1.74 | 1.74 | 1.74 | 1.50 |
| $La_2O_3/Gd_2O_3$ | | | | | | |
| $Al_2O_3$ | | | | | | |
| $ZrO_2$ | 2.50 | 1.50 | 2.50 | 1.50 | 2.50 | 2.50 |
| $Nb_2O_5$ | | | | | | |
| $Ta_2O_5$ | 2.00 | | 2.00 | | 2.00 | 2.00 |
| $WO_3$ | | | | | | |
| ZnO | 6.00 | 11.00 | 6.00 | 11.00 | 5.00 | |
| CaO | 5.50 | 3.60 | 5.50 | 3.00 | 5.00 | 11.30 |
| BaO | 9.30 | 10.00 | 9.30 | 2.00 | 2.00 | 8.00 |
| SrO | 6.00 | 6.00 | 6.00 | 6.00 | 6.00 | 5.00 |
| $Sb_2O_3$ | 0.03 | 0.03 | 0.03 | 0.03 | 0.03 | 0.02 |
| Total | 100.03 | 101.03 | 102.03 | 100.43 | 100.23 | 101.32 |

TABLE 8

Examples (mass %)

| No. | 19 | 20 | 21 | 22 | 23 | 24 |
|---|---|---|---|---|---|---|
| nd | 1.69158 | 1.6923 | 1.69096 | 1.69189 | 1.69171 | 1.69182 |
| νd | 53.1 | 53.3 | 53.2 | 52.9 | 53.1 | 53.3 |
| Tg (° C.) | 515 | 514 | 530 | 525 | 532 | 528 |
| At (° C.) | 558 | 557 | 570 | 540 | 572 | 570 |
| α (10$^{-7}$/° C.) | 93 | 91 | 95 | 95 | 94 | 95 |
| Devitrification temperature (° C.) | 820 | | | | 830 | 860 |
| Specific gravity | 3.70 | 3.69 | 3.69 | 3.70 | 3.69 | 3.70 |

TABLE 10

| No. | \multicolumn{6}{c}{Examples (mass %)} | | | | | |
|---|---|---|---|---|---|---|
| | 25 | 26 | 27 | 28 | 29 | 30 |
| nd | 1.69379 | 1.6888 | 1.68799 | 1.67142 | 1.67332 | 1.67355 |
| νd | 53.0 | 53.0 | 52.7 | 55.6 | 55.1 | 54.0 |
| Tg (°C.) | 534 | 497 | 490 | 514 | 512 | 484 |
| At (°C.) | 570 | 537 | 533 | 554 | 552 | 528 |
| α ($10^{-7}$/°C.) | 93 | 96 | 96 | 85 | 91 | 106 |
| Devitrification temperature (°C.) | 830 | 850 | 840 | 850 | 810 | 780 |
| Specific gravity | 3.70 | 3.35 | 3.40 | 3.32 | 3.33 | 3.30 |

TABLE 11

| No. | Examples (mass %) | | | | | |
|---|---|---|---|---|---|---|
| | 31 | 32 | 33 | 34 | 35 | 36 |
| $SiO_2$ | 15.00 | 15.00 | 15.00 | 11.00 | 12.20 | 11.00 |
| $B_2O_3$ | 26.00 | 28.00 | 31.00 | 34.00 | 33.60 | 34.00 |
| $Li_2O$ | 5.50 | 6.50 | 5.50 | 4.50 | 5.50 | 5.00 |
| $SiO_2 + B_2O_3 + Li_2O$ | 46.50 | 49.50 | 51.50 | 49.50 | 51.30 | 50.00 |
| $Y_2O_3$ | 10.00 | 10.00 | 10.00 | 10.00 | 10.00 | 10.00 |
| $La_2O_3$ | 15.00 | 15.00 | 15.00 | 16.40 | 16.40 | 15.90 |
| $Gd_2O_3$ | | | | | | |
| $La_2O_3/Y_2O_3$ | 1.50 | 1.50 | 1.50 | 1.64 | 1.64 | 1.59 |
| $La_2O_3/Gd_2O_3$ | | | | | | |
| $Al_2O_3$ | | | | | | |
| $ZrO_2$ | 2.50 | 2.50 | 2.50 | 1.50 | 2.50 | 1.50 |
| $Nb_2O_5$ | | | | | | |
| $Ta_2O_5$ | 2.00 | 2.00 | 2.00 | | 2.00 | |
| $WO_3$ | | | | | | |
| ZnO | 6.00 | | 6.00 | 12.00 | 5.00 | 12.00 |
| CaO | 11.30 | 11.30 | 11.30 | 3.00 | 5.00 | 3.00 |
| BaO | 2.00 | 6.00 | | 2.00 | 2.00 | 2.00 |
| SrO | 5.00 | 5.00 | 2.00 | 6.00 | 6.00 | 6.00 |
| $Sb_2O_3$ | 0.02 | 0.02 | 0.02 | 0.03 | 0.03 | 0.03 |
| Total | 100.32 | 101.32 | 100.32 | 100.43 | 100.23 | 100.43 |

TABLE 12

| No. | Examples (mass %) | | | | | |
|---|---|---|---|---|---|---|
| | 31 | 32 | 33 | 34 | 35 | 36 |
| nd | 1.67885 | 1.66831 | 1.67112 | 1.67027 | 1.66976 | 1.66941 |
| νd | 53.4 | 54.9 | 55.1 | 55.4 | 55.3 | 55.5 |
| Tg (°C.) | 492 | 490 | 530 | 515 | 514 | 510 |
| At (°C.) | 534 | 530 | 560 | 554 | 552 | 550 |
| α ($10^{-7}$/°C.) | 100 | 102 | 93 | 82 | 88 | 84 |
| Devitrification temperature (°C.) | 780 | 760 | 760 | 820 | 820 | 850 |
| Specific gravity | 3.35 | 3.28 | 3.31 | 3.30 | 3.29 | 3.28 |

TABLE 13

| No. | Examples (mass %) | | | | | |
|---|---|---|---|---|---|---|
| | 37 | 38 | 39 | 40 | 41 | 42 |
| $SiO_2$ | 12.20 | 15.00 | 15.00 | 11.00 | 12.00 | 8.00 |
| $B_2O_3$ | 33.60 | 31.00 | 31.00 | 32.97 | 32.97 | 32.97 |
| $Li_2O$ | 6.00 | 5.50 | 5.50 | 7.50 | 8.50 | 7.50 |
| $SiO_2 + B_2O_3 + Li_2O$ | 51.80 | 51.50 | 51.50 | 51.47 | 53.47 | 48.47 |
| $Y_2O_3$ | 10.00 | | | | | |
| $La_2O_3$ | 15.90 | 12.50 | 10.00 | 10.00 | 12.00 | 12.00 |
| $Gd_2O_3$ | | 12.50 | 15.00 | 20.00 | 18.00 | 18.00 |
| $La_2O_3/Y_2O_3$ | 1.59 | | | | | |
| $La_2O_3/Gd_2O_3$ | | 1.00 | 0.67 | 0.50 | 0.67 | 0.67 |
| $Al_2O_3$ | | 2.00 | | | | |
| $ZrO_2$ | 2.50 | 2.50 | 2.50 | 1.50 | 2.50 | 1.50 |
| $Nb_2O_5$ | | | | | | |
| $Ta_2O_5$ | 2.00 | 2.00 | 2.00 | | 2.00 | |
| $WO_3$ | | | 2.00 | | | |
| ZnO | 5.00 | 6.00 | 6.00 | 11.00 | 5.00 | 11.00 |
| CaO | 5.00 | 9.30 | 9.30 | | 2.00 | |
| BaO | 2.00 | | | 2.00 | 2.00 | 2.00 |
| SrO | 6.00 | 2.00 | 2.00 | 4.00 | 3.00 | 7.00 |
| $Sb_2O_3$ | 0.03 | 0.02 | 0.02 | 0.03 | 0.03 | 0.03 |
| Total | 100.23 | 100.32 | 100.32 | 100.00 | 100.00 | 100.00 |

TABLE 14

| No. | \multicolumn{6}{c}{Examples (mass %)} | | | | | |
|---|---|---|---|---|---|---|
| | 37 | 38 | 39 | 40 | 41 | 42 |
| nd | 1.66841 | 1.67308 | 1.66939 | 1.66275 | 1.66210 | 1.66873 |
| vd | 55.4 | 54.1 | 54.5 | 55.3 | 55.1 | 54.6 |
| Tg (° C.) | 512 | 525 | 527 | 494 | 497 | 481 |
| At (° C.) | 551 | 555 | 558 | 529 | 535 | 510 |
| α ($10^{-7}$/° C.) | 91 | 93 | 93 | 95 | 103 | 98 |
| Devitrification temperature (° C.) | 820 | 790 | 750 | 810 | 800 | 840 |
| Specific gravity | 3.26 | 3.32 | 3.30 | 3.25 | 3.24 | 3.28 |

TABLE 15

| No. | 43 | 44 | 45 | 46 | 47 | 48 |
|---|---|---|---|---|---|---|
| | \multicolumn{6}{c}{Examples (mass %)} | | | | | |
| $SiO_2$ | 8.00 | 12.00 | 8.00 | 10.00 | 8.00 | 8.00 |
| $B_2O_3$ | 32.97 | 32.97 | 32.97 | 32.97 | 32.97 | 30.97 |
| $Li_2O$ | 7.50 | 8.50 | 7.50 | 10.50 | 12.50 | 9.50 |
| $SiO_2 + B_2O_3 + Li_2O$ | 48.47 | 53.47 | 48.47 | 53.47 | 53.47 | 48.47 |
| $Y_2O_3$ | | | | | | |
| $La_2O_3$ | 12.00 | 13.00 | 13.00 | 13.00 | 13.00 | 14.00 |
| $Gd_2O_3$ | 18.00 | 21.00 | 18.00 | 21.00 | 21.00 | 21.00 |
| $La_2O_3/Y_2O_3$ | | | | | | |
| $La_2O_3/Gd_2O_3$ | 0.67 | 0.62 | 0.72 | 0.62 | 0.62 | 0.67 |
| $Al_2O_3$ | | | | | | |
| $ZrO_2$ | 1.50 | 2.50 | 1.50 | 2.50 | 3.50 | 1.50 |
| $Nb_2O_5$ | | 1.00 | | | | |
| $Ta_2O_5$ | | 1.00 | | 2.00 | 1.00 | |
| $WO_3$ | | | | | | |
| ZnO | 9.00 | 5.00 | 7.00 | 5.00 | 5.00 | |
| CaO | | | | | | |
| BaO | 2.00 | | 2.00 | | | |
| SrO | 9.00 | 3.00 | 10.00 | 3.00 | 3.00 | 15.00 |
| $Sb_2O_3$ | 0.03 | 0.03 | 0.03 | 0.03 | 0.03 | 0.03 |
| Total | 100.00 | 100.00 | 100.00 | 100.00 | 100.00 | 100.00 |

TABLE 17

| No. | 49 | 50 | 51 | 52 | 53 | 54 |
|---|---|---|---|---|---|---|
| | \multicolumn{6}{c}{Example (mass %)} | | | | | |
| $SiO_2$ | 10.00 | 8.00 | 8.00 | 8.00 | 8.00 | 8.00 |
| $B_2O_3$ | 33.97 | 32.97 | 32.97 | 32.97 | 32.97 | 32.97 |
| $Li_2O$ | 10.50 | 7.50 | 7.50 | 7.50 | 7.50 | 7.50 |
| $SiO_2 + B_2O_3 + Li_2O$ | 54.47 | 48.47 | 48.47 | 48.47 | 48.47 | 48.47 |
| $Y_2O_3$ | | | | | | |
| $La_2O_3$ | 17.00 | 13.00 | 13.00 | 13.00 | 13.00 | 13.00 |
| $Gd_2O_3$ | 26.00 | 18.00 | 18.00 | 18.00 | 18.00 | 18.00 |
| $La_2O_3/Y_2O_3$ | | | | | | |
| $La_2O_3/Gd_2O_3$ | 0.65 | 0.72 | 0.72 | 0.72 | 0.72 | 0.72 |
| $Al_2O_3$ | | | 1.50 | | | |
| $ZrO_2$ | 2.50 | 1.50 | 1.50 | 1.50 | 1.50 | 1.50 |
| $Nb_2O_5$ | | | | | | |
| $Ta_2O_5$ | | | | | | |
| $WO_3$ | | | | | 1.00 | |
| ZnO | | 7.00 | | 4.00 | 4.00 | |
| CaO | | | 9.50 | 4.00 | | |
| BaO | | | | 2.00 | 9.00 | 19.00 |
| SrO | | 12.00 | 8.00 | 9.00 | 5.00 | |
| $Sb_2O_3$ | 0.03 | 0.03 | 0.03 | 0.03 | 0.03 | 0.03 |
| Total | 100.00 | 100.00 | 100.00 | 100.00 | 100.00 | 100.00 |

TABLE 16

| No. | 43 | 44 | 45 | 46 | 47 | 48 |
|---|---|---|---|---|---|---|
| | \multicolumn{6}{c}{Examples (mass %)} | | | | | |
| nd | 1.66775 | 1.66462 | 1.66808 | 1.66404 | 1.66184 | 1.66544 |
| vd | 54.9 | 54.9 | 55.1 | 54.3 | 53.6 | 54.9 |
| Tg (° C.) | 483 | 504 | 486 | 482 | 465 | 465 |
| At (° C.) | 510 | 537 | 520 | 510 | 498 | 494 |
| α ($10^{-7}$/° C.) | 100 | 95 | 99 | 102 | 105 | 114 |
| Devitrification temperature (° C.) | 850 | 820 | 850 | 810 | 880 | 880 |
| Specific gravity | 3.27 | 3.26 | 3.27 | 3.25 | 3.25 | 3.26 |

TABLE 18

| | Examples (mass %) | | | | | |
|---|---|---|---|---|---|---|
| No. | 49 | 50 | 51 | 52 | 53 | 54 |
| nd | 1.66589 | 1.66779 | 1.66612 | 1.66765 | 1.66712 | 1.66558 |
| vd | 55.4 | 55.2 | 55.5 | 55.4 | 55.6 | 56.0 |
| Tg (° C.) | 500 | 488 | 486 | 481 | 480 | 490 |
| At (° C.) | 529 | 521 | 517 | 516 | 515 | 520 |
| α ($10^{-7}$/° C.) | 103 | 99 | 108 | 103 | 105 | 101 |
| Devitrification temperature (° C.) | 880 | 830 | 850 | 840 | 850 | 880 |
| Specific gravity | 3.26 | 3.27 | 3.48 | 3.53 | 3.49 | 3.50 |

TABLE 19

| | Examples (mass %) | | | | | |
|---|---|---|---|---|---|---|
| No. | 55 | 56 | 57 | 58 | 59 | 60 |
| $SiO_2$ | 8.00 | 12.00 | 11.00 | 11.00 | 12.20 | 11.00 |
| $B_2O_3$ | 32.97 | 32.97 | 32.97 | 34.00 | 33.60 | 32.50 |
| $Li_2O$ | 7.50 | 8.50 | 7.50 | 5.00 | 6.00 | 5.00 |
| $SiO_2 + B_2O_3 + Li_2O$ | 48.47 | 53.47 | 51.47 | 50.00 | 51.80 | 48.50 |
| $Y_2O_3$ | | | | | | |
| $La_2O_3$ | 13.00 | 15.00 | 14.00 | 10.00 | 10.00 | 11.00 |
| $Gd_2O_3$ | 19.00 | 22.00 | 20.00 | 15.90 | 15.90 | 16.40 |
| $La_2O_3/Y_2O_3$ | | | | | | |
| $La_2O_3/Gd_2O_3$ | 0.68 | 0.68 | 0.70 | 0.63 | 0.63 | 0.67 |
| $Al_2O_3$ | | | | | | 1.00 |
| $ZrO_2$ | 1.50 | 2.50 | 1.50 | 1.50 | 2.50 | 0.50 |
| $Nb_2O_5$ | | | | | | |
| $Ta_2O_5$ | | 2.00 | | | 2.00 | |
| $WO_3$ | | | | | | |
| ZnO | 3.00 | 2.00 | 11.00 | 12.00 | 5.00 | 12.00 |
| CaO | 5.00 | | | 3.00 | 5.00 | 3.00 |
| BaO | | | 2.00 | 2.00 | 2.00 | 2.00 |
| SrO | 10.00 | 3.00 | 2.00 | 6.00 | 6.00 | 6.00 |
| $Sb_2O_3$ | 0.03 | 0.03 | 0.03 | 0.03 | 0.03 | 0.03 |
| Total | 100.00 | 100.00 | 100.00 | 100.43 | 100.23 | 100.43 |

TABLE 20

| | Examples (mass %) | | | | | |
|---|---|---|---|---|---|---|
| No. | 55 | 56 | 57 | 58 | 59 | 60 |
| nd | 1.66706 | 1.66646 | 1.66646 | 1.66302 | 1.66260 | 1.66890 |
| vd | 55.3 | 55.2 | 55.0 | 55.8 | 55.7 | 55.4 |
| Tg (° C.) | 473 | 512 | 495 | 508 | 503 | 512 |
| At (° C.) | 508 | 543 | 531 | 548 | 540 | 547 |
| α ($10^{-7}$/° C.) | 109 | 95 | 91 | 84 | 91 | 85 |
| Devitrification temperature (° C.) | 820 | 850 | 800 | 790 | 800 | 790 |
| Specific gravity | 3.52 | 3.51 | 3.50 | 3.48 | 3.47 | 3.53 |

TABLE 21

| | Examples | | |
|---|---|---|---|
| No. | 23 | 33 | 55 |
| Degree of abrasion Aa | 115 | 102 | 116 |
| Degree of coloring | 36/29 | 36/28 | 36/28 |

TABLE 22

| | Comparative Examples (mass %) | | | | | |
|---|---|---|---|---|---|---|
| No. | A | B | C | D | E | F |
| $SiO_2$ | 10.00 | 10.00 | 24.00 | 15.00 | 4.00 | 2.00 |
| $B_2O_3$ | 30.00 | 30.00 | 15.00 | 20.00 | 22.00 | 26.00 |
| $Li_2O$ | 5.00 | 5.00 | 7.20 | 4.00 | 1.00 | 3.00 |
| $SiO_2 + B_2O_3 + Li_2O$ | 45.00 | 45.00 | 46.20 | 39.00 | 27.00 | 31.00 |
| $Y_2O_3$ | | | | | | |
| $La_2O_3$ | 20.00 | 5.00 | 13.00 | 15.00 | 32.00 | 39.00 |
| $Gd_2O_3$ | 10.00 | 25.00 | | 10.00 | | |
| $La_2O_3/Y_2O_3$ | | | | | | |
| $La_2O_3/Gd_2O_3$ | 2.00 | 0.20 | | 1.50 | | |
| $GeO_3$ | | | | | 4.00 | |
| $AL_2O_3$ | | | 0.80 | 4.60 | | |
| $TiO_2$ | | | 4.50 | 0.10 | | |
| $ZrO_2$ | | | 1.80 | 4.00 | 3.00 | |
| $Nb_2O_5$ | | | 6.80 | 0.30 | 5.00 | 8.00 |
| $Ta_2O_5$ | | | | | 4.00 | 1.00 |
| $WO_3$ | | | | | 4.90 | 15.00 |
| ZnO | | | 22.40 | 5.00 | 18.00 | 6.00 |
| CaO | 8.00 | 15.00 | 1.50 | 10.00 | | |
| BaO | 17.00 | 10.00 | | 10.00 | | |
| SrO | | | | | | |
| $Na_2O$ | | | 3.00 | 2.00 | 2.00 | |
| $As_2O_3$ | | | | | 0.10 | |
| Total | 100.00 | 100.00 | 100.00 | 100.00 | 100.00 | 100.00 |

TABLE 23

| No. | Comparative Examples (mass %) | | | | | |
| --- | --- | --- | --- | --- | --- | --- |
| | A | B | C | D | E | F |
| nd | 1.67378 | 1.66846 | 1.691 | 1.67390 | 1.7865 | 1.81 |
| vd | 55.9 | 55.6 | 48.6 | 51.4 | 41.6 | 41.3 |
| Tg (° C.) | | | 455 | | 525 | 520 |
| At (° C.) | 542 | 546 | 490 | 535 | 560 | 555 |
| α ($10^{-7}$/° C.) | | | 102 | | | |
| Devitrification temperature (° C.) | 970 | 980 | 900 | 1000 | 970 | 980 |
| Specific gravity | 3.43 | 3.40 | 3.20 | 3.50 | 4.48 | 4.57 |

TABLE 24

| | Examples (mass %) | | Comparative Examples (mass %) | |
| --- | --- | --- | --- | --- |
| No. | 15 | 55 | E | F |
| Specific gravity | 3.73 | 3.52 | 4.48 | 4.57 |
| Sphere-converted diameter φ of gob | 9.6 | 9.6 | 9.7 | 9.6 |
| Radius of curvature R of upper surface (mm) | 10.5 | 9.8 | 11.7 | 12.0 |
| R/φ | 1.09 | 0.96 | 1.21 | 1.30 |

As shown in Tables 1 to 20, the glasses of Examples No. 1 to No. 60 all have devitrification temperature, Tg and specific gravity within desired ranges and satisfy refractive index (nd) and Abbe number (vd) within the ranges which are the object of the invention. Since these glasses satisfy ranges of a low Tg and satisfactory specific gravity while maintaining a low devitrification temperature, excellent productivity as glasses for press molding can be expected.

Table 21 shows the degree of abrasion and degree of coloring of the glasses of these examples. These glasses have the degree of abrasion As which exceeds 100, exhibiting excellent processability. These glasses exhibit also good transmittance and, therefore, they are suitable for optical materials.

As Comparative Examples No. A and No. B, Examples 1 and 2 of Japanese Patent No. 2616958 were used. The glasses of Comparative Examples No. A and B do not satisfy the composition range required by the present invention and do not satisfy the devitrification temperature required by the present invention either.

As Comparative Examples No. C and No. D, Examples of Japanese Patent No. 3423673 and Japanese Patent No. 3015078 were used. These glasses do not satisfy the composition range required by the present invention and do not satisfy either devitrification temperature or Abbe number required by the present invention. These glasses therefore are not suitable for glasses for press molding.

As Comparative Examples No. E and No. F, the examples of Japanese Patent Application Laid-open Publication No. 2002-12243 were used. These glasses do not satisfy the composition range of the present invention and therefore have higher devitrification temperature and larger specific gravity and hence are not suitable for glasses for press molding.

For confirming flatness of glass gobs, tests for obtaining glass gobs were conducted in the same manner as in Japanese Patent No. 2798208 by using Examples No. 15 and 55 and Comparative Examples No. E and No. F.

The tests were conducted with the temperature of the flow tube dripping molten glass into the mold being maintained at 800° C.-1000° C. in accordance with devitrification temperature of each glass gob. Table 24 shows specific gravity, diameter φ of the gobs calculated as being converted to a sphere and radius of curvature R of upper surface of the gobs obtained. In an ideal sphere, R/φ becomes 0.5.

As shown in Table 24, Examples No. 15 and No. 55 both have closely spherical shapes mainly because they have small specific gravity. In contrast, Comparative Examples No. E and No. F both have flat shapes because they have specific gravity exceeding 4. Therefore, in the glasses of Comparative Examples No. E and No. F, cooling speed must be increased as compared with the glasses of Examples No. 15 and No. 55 for obtaining a gob having a closely spherical shape and this will tend to cause the above described defects such as cracks and flaws in the gob produced.

The diameter calculated as being converted to a sphere in these tests is used for confirming that a gob having a small value of flatness suitable for a glass for press molding can be obtained by the present invention and in no way limits the shape of gob obtained by the present invention.

As described in the foregoing, the glass for press molding of the present invention has an extremely low Tg and devitrification temperature of 950° C. or below notwithstanding that the glass comprises $SiO_2$, $B_2O_3$, $La_2O_3$ and $Li_2O$ and has a refractive index within a range from 1.60 to 1.75 and an Abbe number within a range from 50 to 60 and, therefore, there is not much evaporation of glass components resulting in burden to a mold such as deterioration and contamination of the mold and hence the glass of the present invention is quite suitable for a glass for press molding.

Since the glass of the present invention has a low specific gravity, in a case where a gob is produced by dripping, a gob having a spherical shape can be easily obtained without a quick cooling process and this prevents occurrence of defects such as cracks and flaws of the gob. Further, since processes such as grinding and polishing can be easily performed when it is necessary to adjust a gob finely to a preform having a spherical shape by grinding or polishing, the present invention is advantageous in improving yield of product and shortening of processing time. In such processes, the gob made of the glass of the present invention is advantageous because stress caused by quick cooling is significantly reduced.

Since the glass of the present invention has an excellent degree of abrasion, it can be manufactured easily, regardless of whether the glass has a spherical shape or not, by the method using the conventional polishing process or by the press molding method using a polished preform.

INDUSTRIAL APPLICABILITY

According to the present invention, a glass which is very suitable for press molding can be provided. The glass for press molding of the present invention can be used as pickup lenses of various optical disk systems and optical lenses for taking pictures such as general cameras and cameras mounted on automobiles. Since the glass of the present invention has an extremely low Tg, it can be used as optical elements other than lenses, for example, diffraction gratings and prisms and other parts which require fine processing.

The invention claimed is:

1. A glass composition having a devitrification temperature of 1000° C. or below, a glass transformation temperature (Tg) of 535° C. or below and a specific gravity within a range from 3 to 4 and comprising, in mass % calculated on oxide basis:

|  |  |
|---|---|
| $SiO_2$ | 5-18%, |
| $B_2O_3$ | 22-40%, |
| $La_2O_3$ | 10-20%, |
| $ZrO_2$ | 0.5-7%, |
| SrO | 0.5-15%, |
| $Li_2O$ | 2.5-13%, and |
| $Gd_2O_3$ | 12.5-30% |
| $TiO_2$ | 0-3%. |

2. A glass composition as defined in claim 1 having a glass transformation temperature (Tg) of 500° C. or below.

3. A glass composition as defined in claim 1 having a refractive index (nd) within a range from 1.60 to 1.75 and an Abbe number vd) within a range from 50 to 60.

4. A glass composition as defined in claim 1, wherein the ratio of $La_2O_3/Y_2O_3$ in mass % is within a range from 1.0 to 2.5 or the ratio of $La_2O_3/Gd_2O_3$ in mass % is within a range from 0.4 to 1.0 and a total amount in mass % of $SiO_2$, $B_2O_3$ and $Li_2O$ is within a range from 38 to 60%.

5. A glass composition as defined in claim 1 comprising in mass % calculated on oxide basis

|  |  |
|---|---|
| $Y_2O_3$ | 4-20%. |

6. A glass composition as defined in claim 1 comprising in mass % calculated on oxide basis, one or more selected from:

|  |  |
|---|---|
| CaO | 0-15%, |
| BaO | 0-15%, |
| ZnO | 0-15%, |
| $Na_2O$ | 0-5%, |
| $K_2O$ | 0-5%. |

7. A glass composition as defined in claim 1 wherein a total amount in mass % of CaO and BaO is within a range from 1% to less than 10%.

8. A glass composition as defined in claim 1, further comprising in mass % calculated on oxide basis, one or more selected from:

|  |  |
|---|---|
| $Nb_2O_5$ | 0-3%, |
| $Ta_2O_5$ | 0-5%, |
| $WO_3$ | 0-5%, |
| MgO | 0-3%, |
| $GeO_2$ | 0-10%, |
| $Al_2O_3$ | 0-5%, |
| $Yb_2O_3$ | 0-10%, and |
| $Sb_2O_3$ | 0-10%. |

9. A glass composition as defined in claim 1 having an abrasion Aa of 100 or over.

10. A glass composition as defined in claim 1 wherein the glass composition is in a shape of a preform having a diameter calculated as being converted to a sphere of 9 mm or over, the ratio of radius of curvature of the upper surface of the preform to the diameter calculated as being converted to a sphere is 1.1 or below.

11. A preform for press molding made of a glass composition as defined in claim 1.

12. An optical element made by forming and processing a preform as defined in claim 11.

13. An optical element made by forming and processing a glass composition as defined in claim 1.

* * * * *

UNITED STATES PATENT AND TRADEMARK OFFICE
CERTIFICATE OF CORRECTION

PATENT NO. : 8,507,394 B2
APPLICATION NO. : 11/912221
DATED : August 13, 2013
INVENTOR(S) : Koji Shimizu It is certified that error appears in the above-identified patent and that said Letters Patent is hereby corrected as shown below:

In the Claims

Col. 27, lines 7-20, should read,

Claim 1

A glass composition having a devitrification temperature of 820 ~~1000~~°C or below, a glass transformation temperature (Tg) of 535°C or below and a specific gravity within a range from 3 to 4 and comprising, in mass % calculated on oxide basis:

| | |
|---|---|
| $SiO_2$ | 5 – 18%, |
| $B_2O_3$ | 22 – 40%, |
| $La_2O_3$ | 10 – 20%, |
| $ZrO_2$ | 0.5 – 7%, |
| SrO | 0.5 – 15%, |
| $Li_2O$ | 2.5 – 13%, ~~and~~ |
| $Gd_2O_3$ | 12.5 – 30%, and |
| $TiO_2$ | 0–3%, | wherein the ratio of $La_2O_3/Gd_2O_3$ in mass% is within a range from 0.4 to 1.0 and the upper limit of the sum of amounts of $SiO_2$, $B_2O_3$ and $Li_2O$ in mass% is 55%.

Col. 27, lines 21-22, should read,

Claim 2

A glass composition as defined in claim 1 having a glass transformation temperature (Tg) of 500°C[[.]]or below.

Signed and Sealed this
Twelfth Day of November, 2013

Teresa Stanek Rea
*Deputy Director of the United States Patent and Trademark Office*

CERTIFICATE OF CORRECTION (continued)
U.S. Pat. No. 8,507,394 B2

Col. 27, lines 23-25, should read,

Claim 3

A glass composition as defined in claim 1 having a refractive index (nd) within a range from 1.60 to 1.75 and an Abbe number ($v$ d) within a range from 50 to 60.

Col. 27, lines 26-30, should read,

Claim 4

A glass composition as defined in claim 1, wherein the ratio of $La_2O_3/Y_2O_3$ in mass % is within a range from 1.0 to 2.5 ~~or the ratio of $La_2O_3/Gd_2O_3$ in mass % is within a range from 0.4 to 1.0~~ and a total amount in mass % of $SiO_2$, $B_2O_3$ and $Li_2O$ is within a range from 38 to [[60]]55%.

Col. 27-28, lines 39-7, should read,

Claim 6

A glass composition as defined in claim 1 comprising in mass % calculated an oxide basis, one or more selected from:

| | |
|---|---|
| CaO | 0 – 15%, |
| BaO | 0 – 15%, |
| ZnO | 0 – 15%, |
| $Na_2O$ | 0 – 5%, and |
| $K_2O$ | 0 – 5%. |